United States Patent
Mac Ewen et al.

(10) Patent No.: US 8,136,347 B2
(45) Date of Patent: Mar. 20, 2012

(54) ALGORITHM TO DIAGNOSE LEAKS OR BLOCKAGES DOWNSTREAM OF THE SECONDARY AIR INJECTION REACTION (SAIR) PRESSURE SENSOR

(75) Inventors: Ian J. Mac Ewen, White Lake, MI (US); Martin L. Hall, Rochester Hills, MI (US); Lawrence O Murray, White Lake, MI (US); Julia C. Grow, Whitmore Lake, MI (US); Richard A. Van Camp, Brighton, MI (US); David Edward Prout, Linden, MI (US); Igor Anilovich, Walled Lake, MI (US)

(73) Assignee: GM Global Technology Operations LLC

( * ) Notice: Subject to any disclaimer, the term of this patent is extended or adjusted under 35 U.S.C. 154(b) by 699 days.

(21) Appl. No.: 12/205,313

(22) Filed: Sep. 5, 2008

(65) Prior Publication Data

US 2009/0198457 A1 Aug. 6, 2009

Related U.S. Application Data

(60) Provisional application No. 61/025,556, filed on Feb. 1, 2008.

(51) Int. Cl.
*F01N 3/00* (2006.01)
(52) U.S. Cl. ............... 60/289; 60/274; 60/285; 60/287; 60/290; 60/292
(58) Field of Classification Search ............ 60/274, 60/285, 287, 290, 292, 289
See application file for complete search history.

(56) References Cited

U.S. PATENT DOCUMENTS

| | | | |
|---|---|---|---|
| 6,871,136 B1 | 3/2005 | Wang | |
| 6,966,177 B2* | 11/2005 | Koyama et al. | 60/277 |
| 7,111,454 B2* | 9/2006 | Fulcher et al. | 60/289 |
| 2004/0177605 A1* | 9/2004 | Kojima et al. | 60/274 |
| 2005/0076634 A1* | 4/2005 | Anilovich et al. | 60/274 |

* cited by examiner

*Primary Examiner* — Thomas Denion
*Assistant Examiner* — Michael Carton

(57) ABSTRACT

A control module and method for an exhaust system of an engine can include a secondary air intake (SAI) pressure module that monitors SAI pressure. An accumulation module can accumulate an SAI string length based on the monitored SAI pressure. A calculation module can determine an average SAI string length based on the accumulated SAI string length. A determination module can determine an operating characteristic of the vehicle exhaust based on the average SAI string length.

13 Claims, 7 Drawing Sheets

ALGORITHM TO DIAGNOSE LEAKS OR BLOCKAGES DOWNSTREAM OF THE SECONDARY AIR INJECTION REACTION (SAIR) PRESSURE SENSOR

CROSS-REFERENCE TO RELATED APPLICATIONS

This application claims the benefit of U.S. Provisional Application No. 61/025,556, filed on Feb. 1, 2008. The disclosure of the above application is incorporated herein by reference.

FIELD

The present disclosure relates to secondary air injection reaction systems (SAIR), and more particularly to detecting a leak or blockage in an SAIR system downstream of an SAIR pressure sensor.

BACKGROUND

The statements in this section merely provide background information related to the present disclosure and may not constitute prior art.

It is known to use a catalytic converter in the exhaust gas flow path of a motor vehicle with an internal combustion engine. The catalytic converter includes a substrate with a coating of a catalyst material that catalyzes the oxidation of hydrocarbon molecules and carbon monoxide molecules as well as the reduction of nitrogen oxides emitted in the vehicle exhaust gas. The catalyst performs efficiently when the catalyst is above a minimum temperature to stimulate the desired catalytic reactions and the exhaust gas has the proper fuel to air (F/A) ratio.

It is desirable to optimize the fuel to air ratio delivered to the engine for performance as well as emissions control. Emissions control is increasingly difficult at startup because a higher fraction of delivered fuel remains unburned and is subsequently exhausted, and the catalyst has not reached its operating temperature. Methods have been employed to reduce exhaust emissions and increase catalytic converter performance including increasing engine speed at idle, retarding ignition timing and/or reducing delivered fuel.

One method for improving catalytic converter performance during startup is by utilizing a secondary air injection reaction (SAIR) system. The output of a secondary air injection (SAI) pump can be disposed in the exhaust system upstream of the catalytic converter and be used to inject air into the exhaust to react with unburned and partially burned fuel from the engine in order to heat up the catalyst.

During operation of the engine, it may be useful to detect an SAI failure (such as a leak and/or blockage) in the pipe upstream of an SAI valve associated with the SAIR system. It may also be useful to detect such a fault downstream of the SAI valve of the SAIR system. While some control systems have been able to adequately detect such failures upstream of the SAI valve, it can be difficult to detect failures downstream of the SAI valve.

SUMMARY

A control module and method for an exhaust system of an engine can include a secondary air intake (SAI) pressure module that monitors SAI pressure. An accumulation module can accumulate an SAI string length based on the monitored SAI pressure. A calculation module can determine an average SAI string length based on the accumulated SAI string length. A determination module can determine an operating characteristic of the vehicle exhaust based on the average SAI string length.

According to additional features, the accumulation module can accumulate an amplitude and frequency of the monitored SAI pressure. The accumulation module can accumulate a mass air flow (MAF) of the engine. The calculation module can calculate an average MAF based on the accumulated MAF. The determination module can determine the operating characteristic based on a comparison of the average SAI string length and the average MAF. The determination module can output a signal to a driver information display based on the determined operating characteristic. The SAI pressure module can monitor an SAI pressure signal from an SAI pressure sensor that is disposed between an SAI pump and an SAI control valve. The operating characteristic can comprise a leak or blockage downstream of the SAI valve.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description of the preferred embodiments is merely exemplary in nature and is in no way intended to limit the disclosure, its application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

Figure 1:
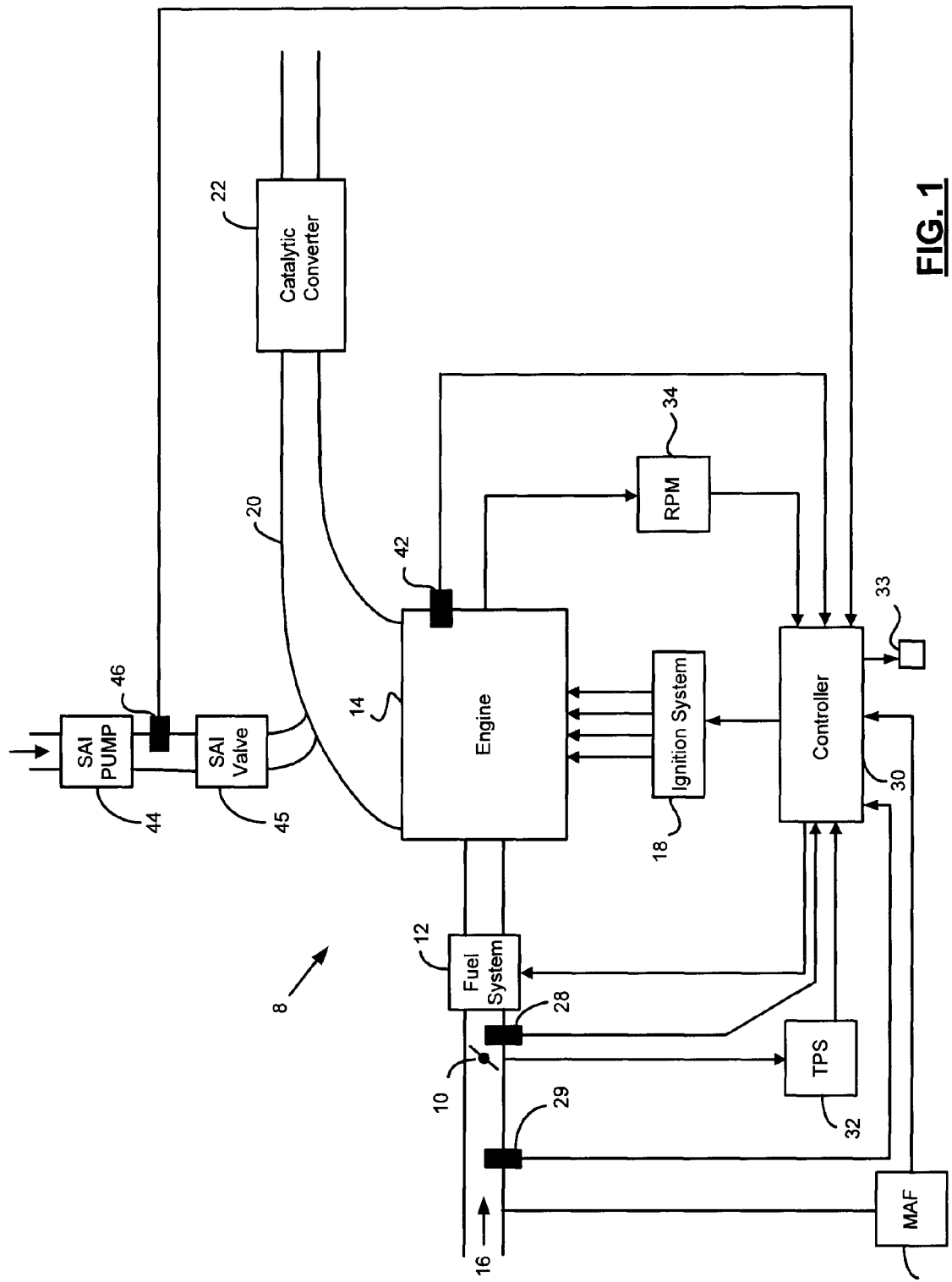
FIG. 1 is a functional block diagram of an engine control system that detects a failure (such as a leak and/or blockage) downstream of an SAI valve according to one example of the present disclosure.

Referring to FIG. 1, an exemplary engine control system 8 is shown. A throttle 10 and a fuel system 12 can control the fuel and primary air delivered to an engine 14 through an intake 16. An ignition system 18 can ignite the fuel and primary air mixture in the engine 14. Exhaust gas created by the ignition of the fuel and primary air mixture can be expelled through an exhaust manifold 20. A catalytic converter 22 can receive the exhaust gas and reduces the emissions levels of the exhaust gas.

A controller 30 can communicate with various components of the engine control system 8, including but not limited to the fuel system 12, the ignition system 18, an intake Manifold Air Pressure (MAP) sensor 28, an Intake Air Temperature (IAT) sensor 29, a throttle position sensor 32 (TPS), a driver information display 33, and an engine speed sensor 34 (RPM). The controller 30 can receive MAP, IAT and RPM signals and a primary air flow signal from a Mass Air Flow sensor (MAF) 36. MAP, IAT, RPM and MAF signals are used to determine the primary flow into the engine 14. The primary flow data and optimum predetermined uncompensated F/A can then be used to calculate fuel delivery from the fuel system 12 to the engine 14. The controller 30 can further communicate with the ignition system 18 to determine ignition timing.

The controller 30 may receive additional feedback from other components in the engine control system 8, including but not limited to coolant temperature from a coolant temperature sensor 42 and throttle position from the Throttle Position Sensor (TPS) 32. These and other variables may affect the overall performance and behavior of the engine control system 8. The controller 30 utilizes data gathered from the various engine components to monitor and, in some cases, optimize engine performance.

In the present disclosure, the controller 30 communicates with an SAI pressure sensor 46 disposed between an SAI pump 44 and an SAI control valve 45. Examples of control systems that control operation of an SAI pump 44, SAI control valve 45 and SAI pressure sensor 46 can be found in commonly owned U.S. Pat. Nos. 6,871,136, and 7,111,454, the disclosures of which are hereby incorporated by reference.

As will be described in greater detail, the SAI pressure sensor 46 can communicate a measured pressure to the controller 30. The controller 30 can interpret the measured pressure to determine a fuel adjustment or compensation value to communicate with the fuel system 12. In general, the pressure measured at the SAI pressure sensor 46 is proportional to the SAI flow, which is proportional to the desired fuel compensation. In this way, if a pressure is measured above a desired level, then there exists excessive SAI flow, which results in exhaust that is lean of the optimum F/A and the controller commands increased fuel delivery through the fuel system 12 to return to the optimal F/A. Similarly, if a pressure is measured below a desired level, then there exists insufficient SAI flow, which results in exhaust that is rich of the optimum F/A and the controller 30 commands a reduced fuel delivery through the fuel system 12 to return to the optimal F/A.

Figure 2:
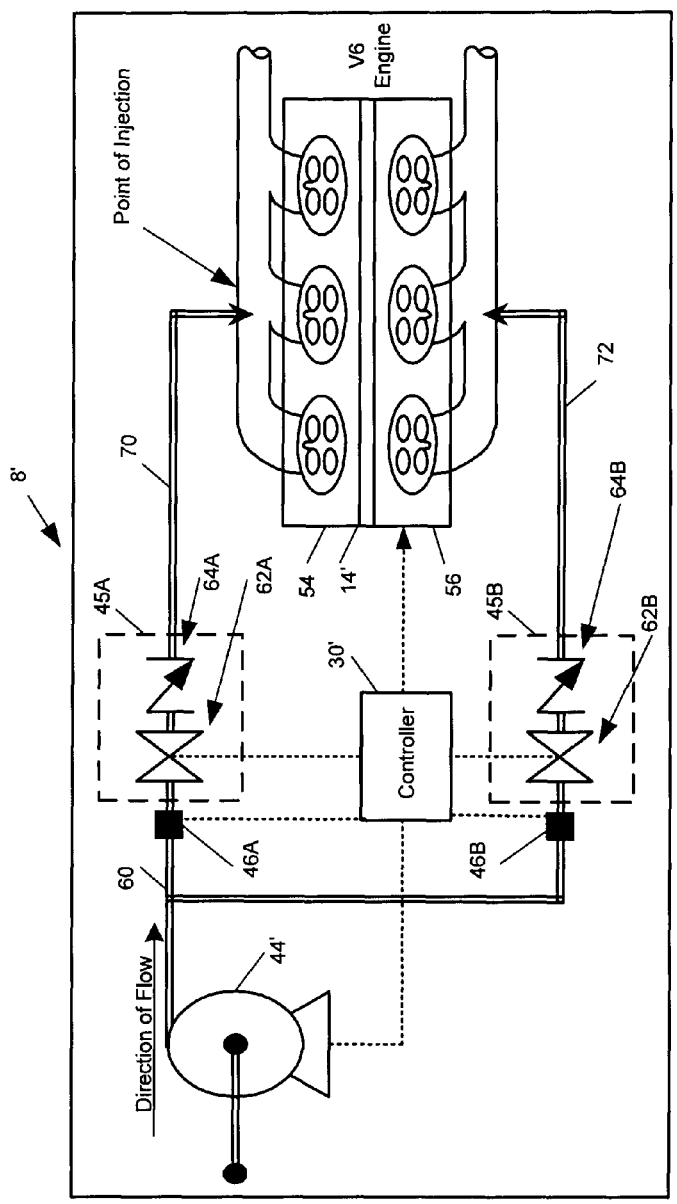
FIG. 2 is a functional block diagram of an engine control system according to the present teachings and incorporated on an exemplary dual bank V6 engine.

Turning now to FIG. 2, one example of the present teachings will be described in greater detail. The engine control system 8' includes an Turning now to FIG. 2, one example of the present teachings will be described in greater detail. The engine control system 8' includes an engine 14' having a dual bank configuration. More specifically, the engine 14' can have a first bank 54 and a second bank 56. The exemplary engine 14' is shown as a V6 engine. It is appreciated, however, that the present teachings can be applied to other engine configurations. Some other engine configurations can include engines having any combination of one through twelve cylinders for example. The cylinders can be arranged in any fashion, such as but not limited to, an in-line configuration, a V configuration or a W configuration.

The engine control system 8' can include an SAI pump 44' that can inject air through SAI tubing 60. As shown in this example, the SAI tubing 60 can split between a first SAI pressure sensor 46A and a second SAI pressure sensor 46B. The SAI pressure sensors 46A and 46B are positioned upstream of a respective first SAI valve assembly 45A and a second SAI valve assembly 45B. In the example shown, each of the SAI valve assemblies 45A and 45B can define a control valve 62A and 62B and a shut-off valve 64A and 64B. In the example shown, the SAI flow can exit the respective SAI valve assemblies 45A and 45B and be injected into each of the first and second banks 54 and 56 of the engine 14'. While single SAI input pipes 70 and 72 is shown dedicated to each engine bank 54 and 56, it is appreciated that each of the SAI input pipes 70 and 72 can alternatively branch out into multiple engine inputs. In one example, there may be an engine input for each cylinder of the engine 14'. A controller 30' can communicate between the SAI pump 44', the respective control valves 62A and 62B, and the engine 14'.

In one example of operation, when one or both of the valves 62A and 62B are open, air can be injected into the SAI tubing 60 from the SAI pump 44' and to the SAI input pipes 70 and 72, based on an air fuel ratio determined by the controller 30'. The additional air can provide hotter exhaust gases in the manifold 20 to help the catalytic converter 22 come up to temperature quickly and therefore reduce emissions during cold start. In one example of operation, one or both of the valves 62A and 62B can be in the closed position, except when the SAI pump 44' is on to prevent exhaust back flow from contaminating hardware upstream of the respective valves 62A and 62B.

Figure 3:
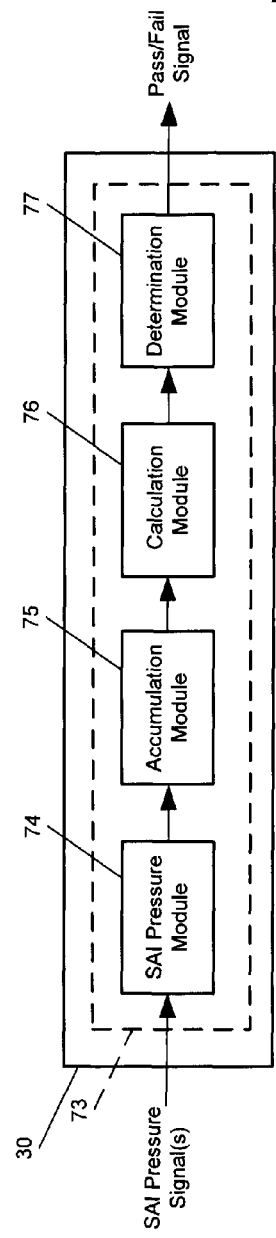
FIG. 3 is a functional block diagram of an exemplary SAI control module according to the present teachings.

With reference now to FIG. 3, an exemplary SAI control module 73 is shown. The exemplary SAI control module 73 can include an SAI pressure module 74, an accumulation module 75, a calculation module 76 and a determination module 77. In one example, the SAI pressure module 74 can monitor the SAI pressure signal from the SAI pressure sensor 46 (or from the first and second SAI pressure sensors 46a and 46b, FIG. 2). The SAI pressure module 74 can output a signal to the accumulation module 75 based on the monitored SAI pressure signal. The accumulation module 75 can accumulate an SAI string length based on the output of the SAI pressure module 74. In other examples, the accumulation module 75 can accumulate a MAF and a total test time. The accumulation module 75 can output a signal to the calculation module 76 based on the accumulations. The calculation module 76 can calculate an average string length based on the output from the accumulation module 75. In other examples, the calculation module 76 can calculate an average MAF. The calculation module 76 can also calculate an SAI average pressure error. The calculation module 76 can produce an output to the determination module 77 based on the calculations. The determination module 77 can determine if the SAI average pressure error is within a normal range. The determination module 77 can determine if the SAI average string length is within a normal range. The determination module 77 can output a pass or fail signal based on the determinations.

Figure 4:
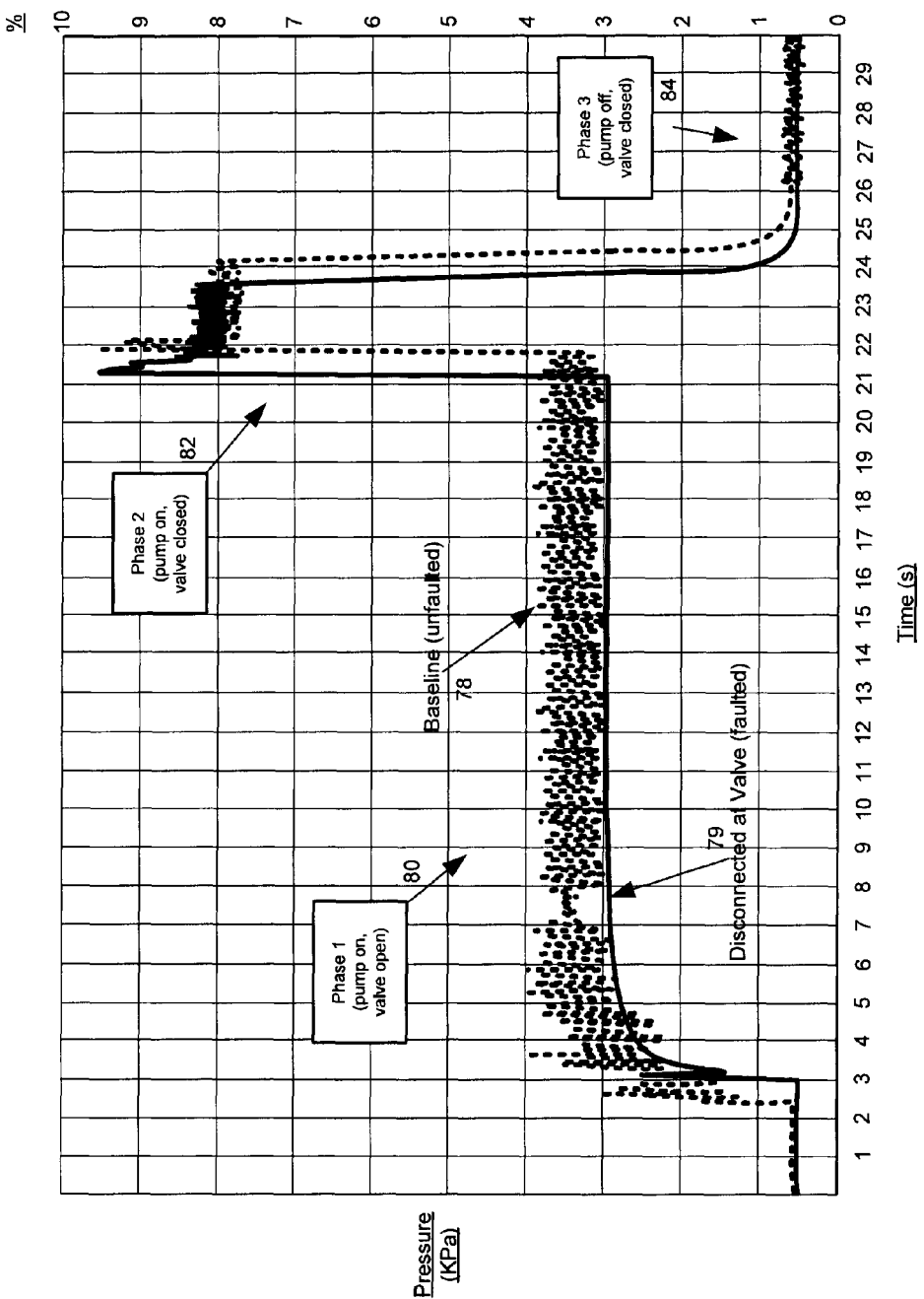
FIG. 4 is an exemplary plot illustrating a comparison of first signal that represents a raw pressure from a baseline (unfaulted) SAI system and a second signal that represents a disconnected (faulted) SAI system pipe.

Turning now to FIG. 4, a comparison plot of a first and second raw pressure signals taken from SAI pressure sensor 46A for two different samples is shown. In one sample, a base line or unfaulted plot 78 is shown during "normal" operation. In one example, "normal" operation includes the pump 44' "on" and the valve 45' in an "open" position. In another plot 79, pressure is shown with the SAI input pipe 70 removed downstream of the SAI pressure sensor 46A. The exemplary plot illustrates a first phase (phase one) 80, a second phase (phase two) 82, and a third phase (phase three) 84. The first phase 80 (shown substantially between four and twenty-one seconds of the exemplary plot) is of importance in the exemplary disclosure as will be described below. Phase two 82 and phase three 84 are additional tests related to the valve 45A and the SAI pump 44' and are beyond the scope of the present disclosure.

Figure 5:
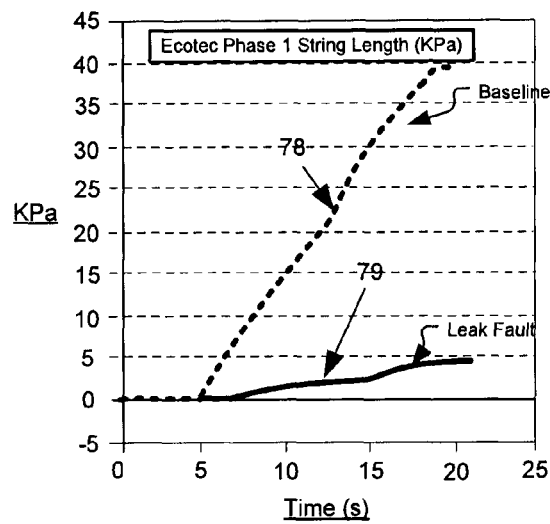
FIG. 5 is a plot illustrating string length accumulation between the first signal (unfaulted) and the second signal (faulted) plot of FIG. 4.

Of note, the baseline or unfaulted plot 78 presents a trace having substantially more noise (varying amplitude and frequencies) compared to the faulted plot 79. Turning now to FIG. 5, the control system and method according to the present teachings accumulates a string length for phase one 80. The term string length is used to denote an accumulated length of a given trace. The accumulated length, therefore, accommodates both amplitude and frequency in one metric. As shown in the exemplary plot of FIG. 5, the baseline or unfaulted plot 78 has a significantly greater accumulated string length as compared to the faulted plot 79.

Figure 6:
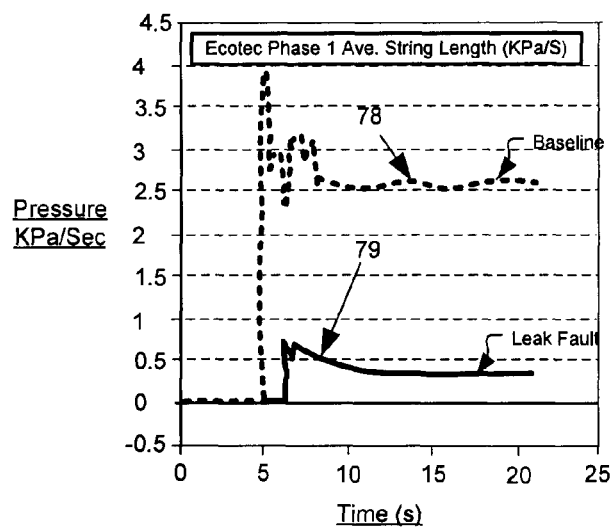
FIG. 6 is a plot illustrating a real time average string length between the first signal (unfaulted) and the second signal (faulted) of FIGS. 4 and 5.

With reference to FIG. 6, a real-time average string length through phase one 80 is shown to compare the baseline or unfaulted plot 78 with the faulted plot 79. As can be appreciated, the noise shown in the baseline plot 78 can be attributed to various exhaust pulses occurring in the exhaust manifold 20. Such pulses are to be expected and are normal. When the SAI input pipe 70 is disconnected (or blocked) downstream of the SAI pressure sensor 46A, such exhaust feedback is discontinued resulting in a relatively smooth plot (e.g., 79) as compared to the unfaulted plot (e.g. 78).

Figure 7:
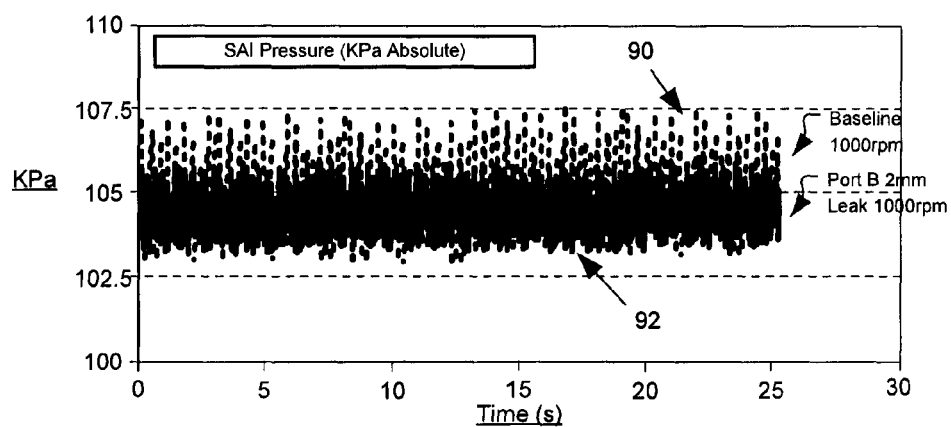
FIG. 7 is a comparison plot between a first signal that represents an unfaulted SAI system and a second signal that represents a faulted SAI system for an exemplary single bank engine equipped with dual SAI input pipes 70, according to one example of the present teachings.
Figure 8:
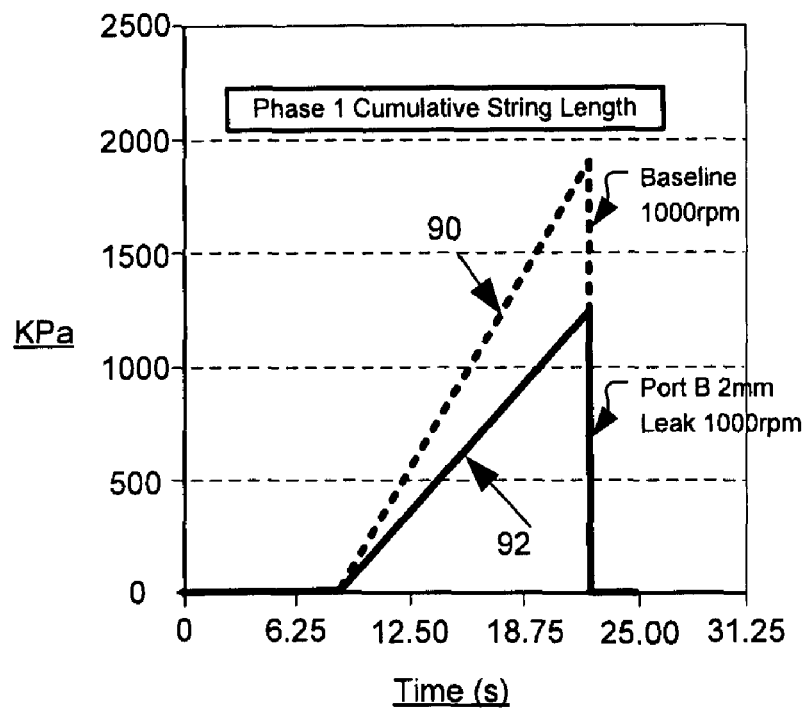
FIG. 8 is a plot illustrating string length accumulation of the first and second signals shown in FIG. 7.
Figure 9:
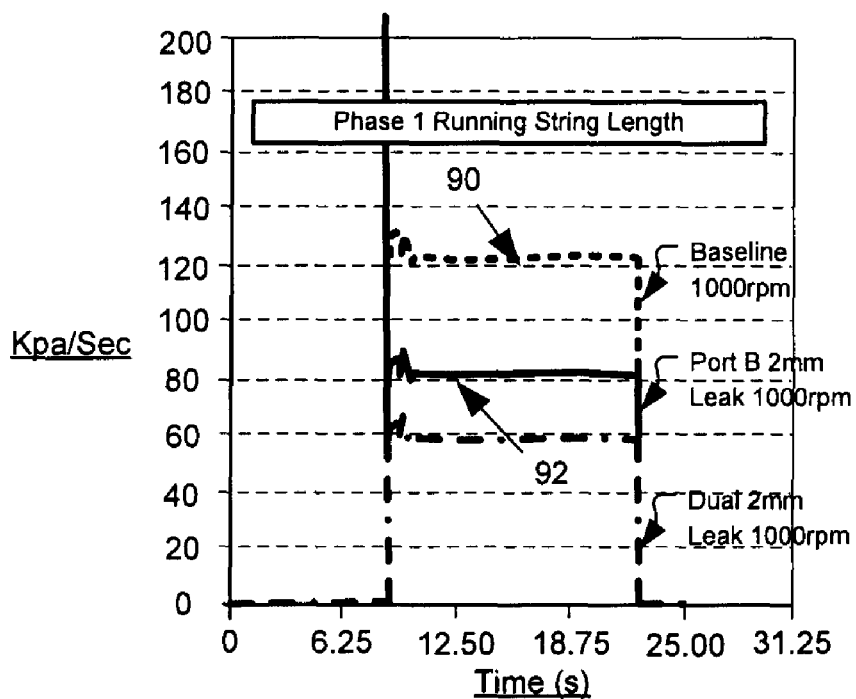
FIG. 9 is a plot illustrating a real time average string length of first and second signals of FIG. 7.

Turning now to FIGS. 7-9, a baseline or unfaulted plot 90 is shown versus a faulted plot 92. The exemplary FIGS. 7-9 represent a single-bank SAI system having two SAI input pipes (i.e. 70), each one feeding two cylinders of a four cylinder engine. Other configurations are contemplated. In this example, the faulted plot 92 represents a scenario on a single bank engine equipped with dual SAI input pipes 70, where only one of the two available SAI input pipes has been disconnected. As can be appreciated because one of the SAI input pipes 70 is still connected, some exhaust feedback can be experienced and contribute to some noise. Still, as shown in the cumulative string length plot of FIG. 9, a distinction can be shown between the baseline or unfaulted plot 90 versus the faulted plot 92.

Figure 10:
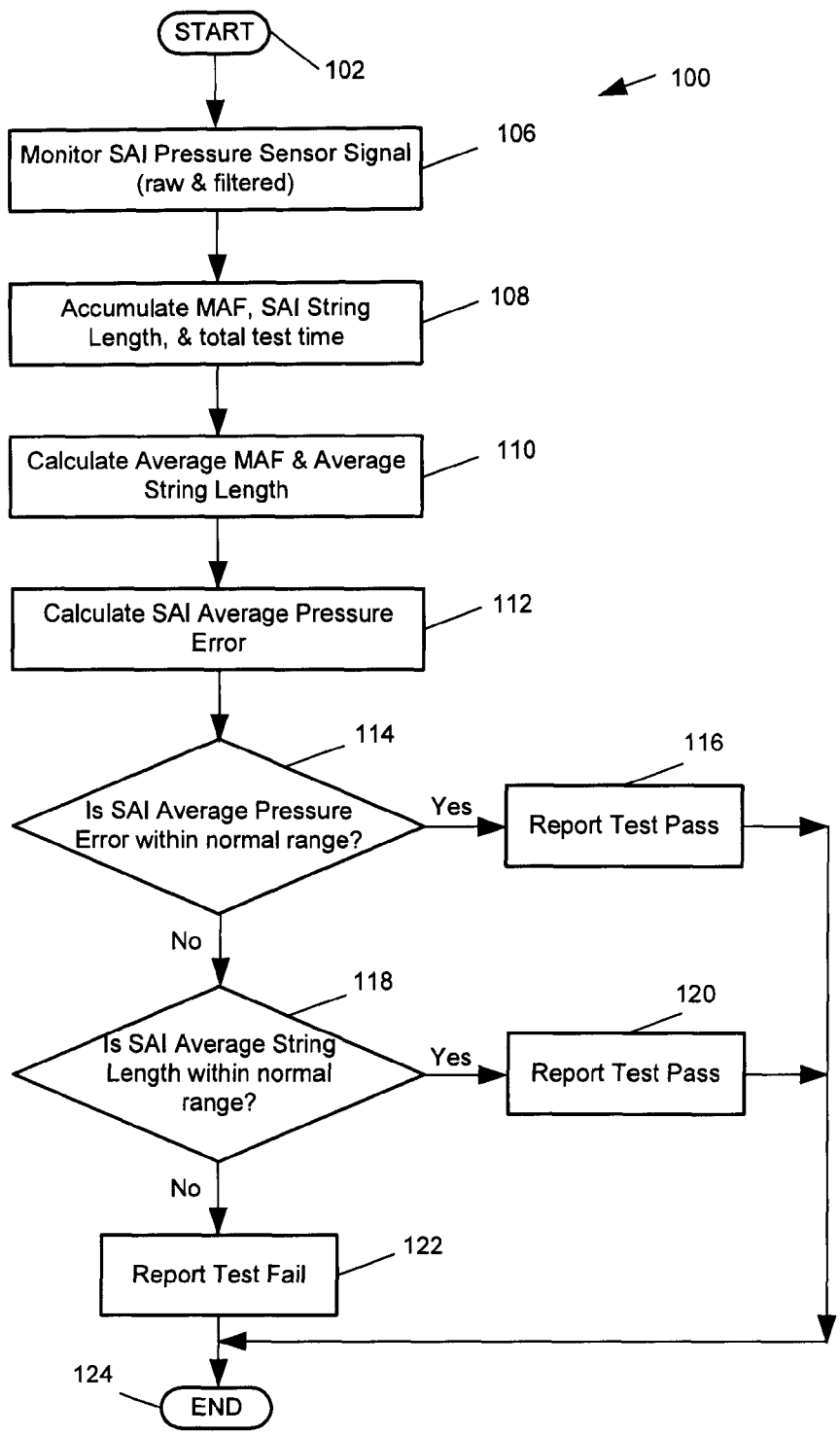
FIG. 10 is an exemplary flow diagram illustrating steps for determining a failure downstream of the SAI valve according to the present teachings.

Turning now to FIG. 10, exemplary steps of the control method according to the present teachings is shown. At the outset, it is appreciated that the following control method can be performed for each SAI pressure sensor in a given engine system. In this way, for the dual SAI pressure sensors 46A and 46B used in the dual bank engine 14' (FIG. 2), the control method can be carried out twice (or once for each SAI pressure sensor 46A and 46B). In step 102, control begins. In step 106, control monitors the SAI pressure signal from the SAI pressure sensor (46, etc.). In one example, this pressure signal can be raw and filtered. In step 108, control accumulates a signal from the MAF 36, an SAI string length, and a total test time. In step 110, control calculates an average MAF and average string length. An average string length can be a sum of the absolute pressure deltas accumulated during phase one (80, etc.) operation, divided by the total test time during phase one operation.

In step 112, control calculates an SAI average pressure error. Additional details on exemplary methods of determining SAI average pressure error may be found in commonly owned U.S. patent application Ser. Nos. 10/772,872 and 10/918,581 cited above. In step 114, control determines if the SAI average pressure error is within a normal range. If the SAI average pressure error is within the normal range, control reports a test pass in step 116 and control ends in step 124. If control determines that the SAI average pressure error is not within the normal range, control determines if SAI average string length is within a normal range in step 118. If the SAI average string length is within the normal range, control reports a test pass in step 120 and ends in step 124. If control determines that SAI average string length is not within the normal range, control reports a test fail in step 122. Reporting a test fail in step 122 can comprise communicating a signal to the driver information display 33 (FIG. 1), and/or setting a fault code in the controller. Control then ends is step 124.

Figure 11:
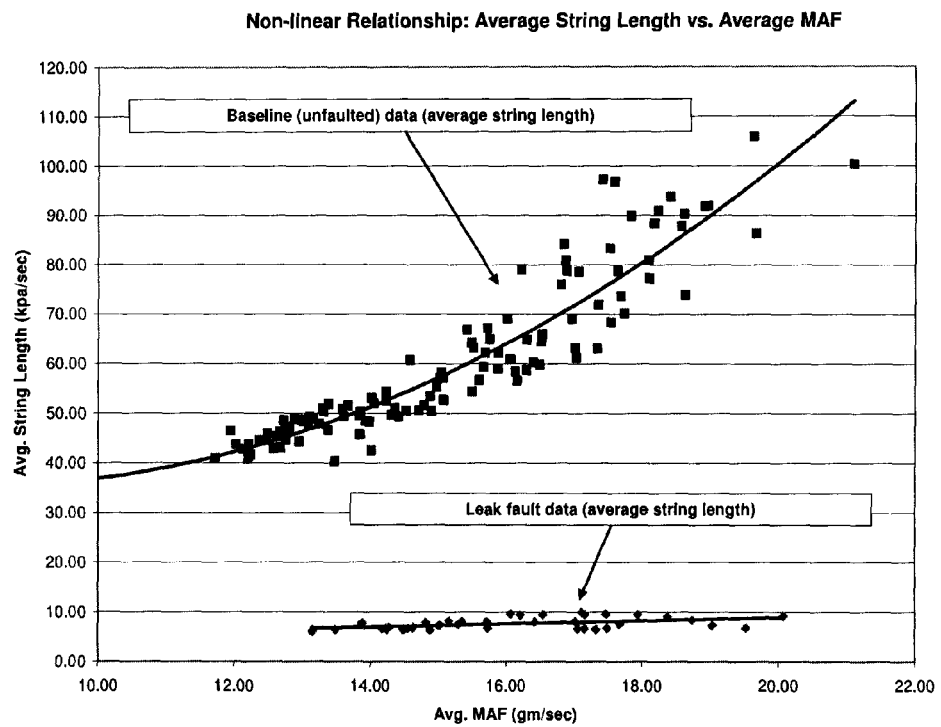
FIG. 11 is a plot illustrating average string length versus average mass air flow (MAF) according to one example of the present teachings.
Figure 12:
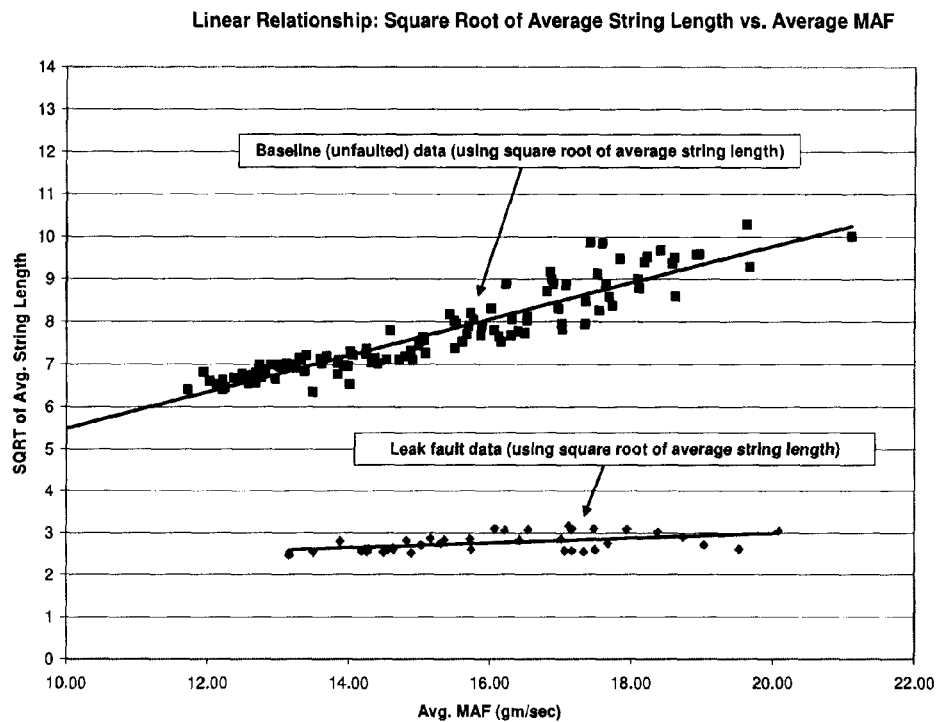
FIG. 12 is a plot illustrating average string length versus average MAF after a linearization technique has been applied to the data in FIG. 11, according to another example of the present teachings.

According to one example, once the average string length calculation result is performed in step 110, it can be compared to a string length value in a lookup table versus average MAF (i.e., step 118). If the actual average MAF doesn't line up with a particular average MAF value in the lookup table, linear interpolation can be used to calculate an approximate string length failure threshold for the actual average MAF value. However, in some vehicle applications, the relationship between average string length and average MAF is non-linear. In these cases, an algorithm feature exists whereby an exponent is applied to the string length in order to linearize the average string length versus MAF relationship, see FIG. 12 (i.e. a value of 0.5 represents the square root, 0.33 represents the cube root, and so on). For comparison, FIG. 11 illustrates a plot of average string length versus average MAF where this algorithm feature is not applied. FIG. 12 is a plot of average string length versus average MAF where this exemplary algorithm is applied.

Those skilled in the art can now appreciate from the foregoing description that the broad teachings of the present teachings can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:
1. A control module for an exhaust system of an engine, the module comprising:
   a secondary air intake (SAI) pressure module that is programmed to monitor SAI pressure;
   an accumulation module that is programmed to calculate an SAI string length based on the monitored SAI pressure, the SAI string length comprising an accumulated length of a trace of SAI pressure including an amplitude and frequency over time;
   a calculation module that is programmed to determine an average SAI string length based on the accumulated SAI string length; and
   a determination module that determines an operating characteristic of the vehicle exhaust based on the average SAI string length.

2. The control module of claim 1 wherein the accumulation module accumulates a mass air flow (MAF) of the engine and wherein the calculation module calculates an average MAF based on the accumulated MAF.

3. The control module of claim 2 wherein the determination module determines the operating characteristic based on a comparison of the average SAI string length and the average MAF.

4. The control module of claim 1 wherein the determination module outputs a signal to a driver information display based on the determined operating characteristic.

5. The control module of claim 1 wherein the SAI pressure module monitors an SAI pressure signal from an SAI pressure sensor disposed between an SAI pump and an SAI control valve.

6. The control module of claim 5 wherein the operating characteristic comprises a leak or blockage downstream of the SAI valve.

7. A method for determining an operating characteristic of an exhaust system of an engine, the method comprising:
monitoring a secondary air intake (SAI) pressure;
calculating an SAI string length based on the monitored SAI pressure, the SAI string length comprising an accumulated length of a trace of SAI pressure including an amplitude and frequency over time;
calculating an average SAI string length based on the accumulated SAI string length; and
determining the operating characteristic of the vehicle exhaust based on the average SAI string length.

8. The method of claim 7, further comprising:
accumulating a mass air flow (MAF) of the engine; and
calculating an average MAF based on the accumulated MAF.

9. The method of claim 8, further comprising:
comparing the average SAI string length and the average MAF; and
determining the operating characteristic based on the comparison.

10. The method of claim 7, further comprising:
outputting a signal to a driver information display based on the determined operating characteristic.

11. The method of claim 7 wherein monitoring the pressure includes monitoring an SAI pressure signal from an SAI pressure sensor disposed between an SAI pump and an SAI control valve.

12. The method of claim 11 wherein determining the operating characteristic includes determining a leak or blockage downstream of the SAI valve based on the average SAI string length.

13. A control module for an exhaust system of an engine, the module comprising:
a secondary air intake (SAI) pressure module that is programmed to monitor SAI pressure;
an accumulation module that is programmed to calculate an SAI string length based on the monitored SAI pressure, the SAI string length comprising an accumulated length of a trace including an amplitude and frequency of SAI pressure over time; and
a determination module that is programmed to determine an operating characteristic of the vehicle exhaust based on the SAI string length.

* * * * *